Figure 1:
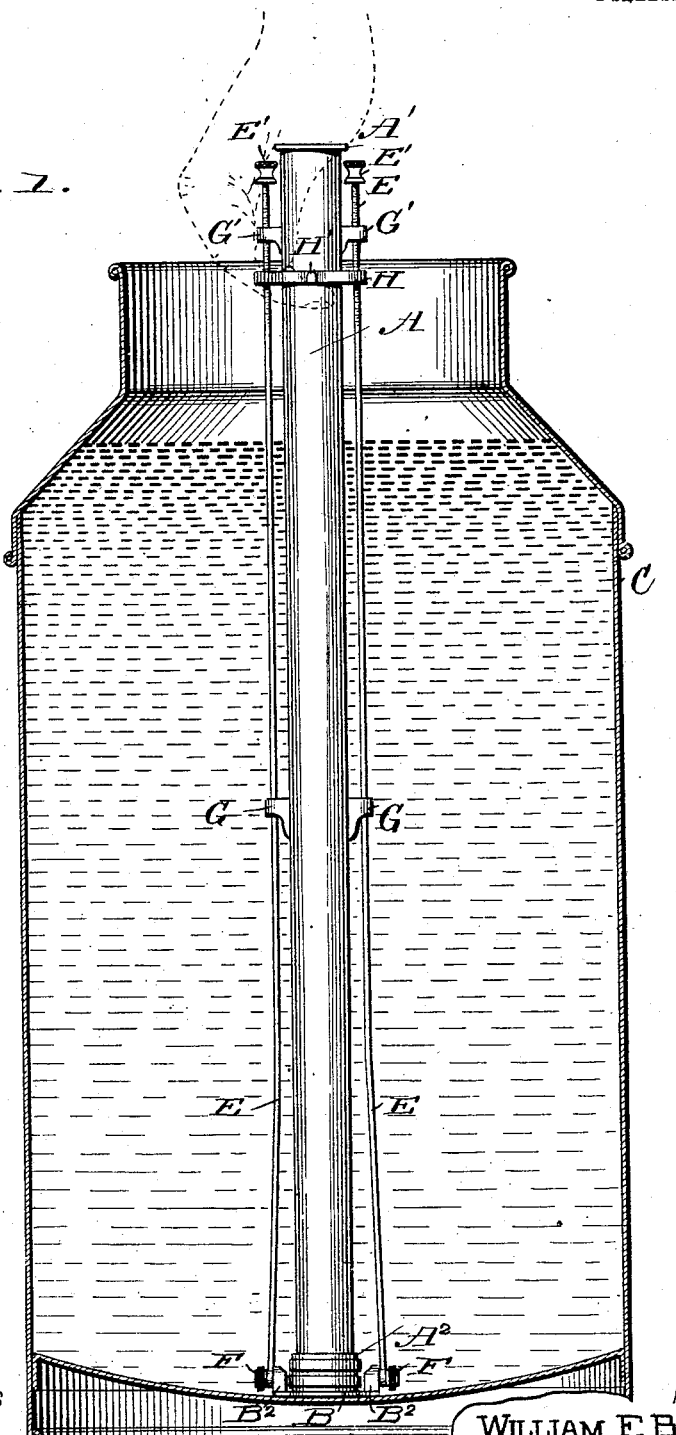

No. 854,563. PATENTED MAY 21, 1907.
W. F. BÜCHER.
MILK SAMPLER.
APPLICATION FILED SEPT. 15, 1906.

2 SHEETS—SHEET 1.

WITNESSES
F. C. Barry
Perry B. Turpin

INVENTOR
WILLIAM F. BÜCHER
BY Munn & Co.
ATTORNEYS

No. 854,563. PATENTED MAY 21, 1907.
W. F. BÜCHER.
MILK SAMPLER.
APPLICATION FILED SEPT. 15, 1906.
2 SHEETS—SHEET 2.
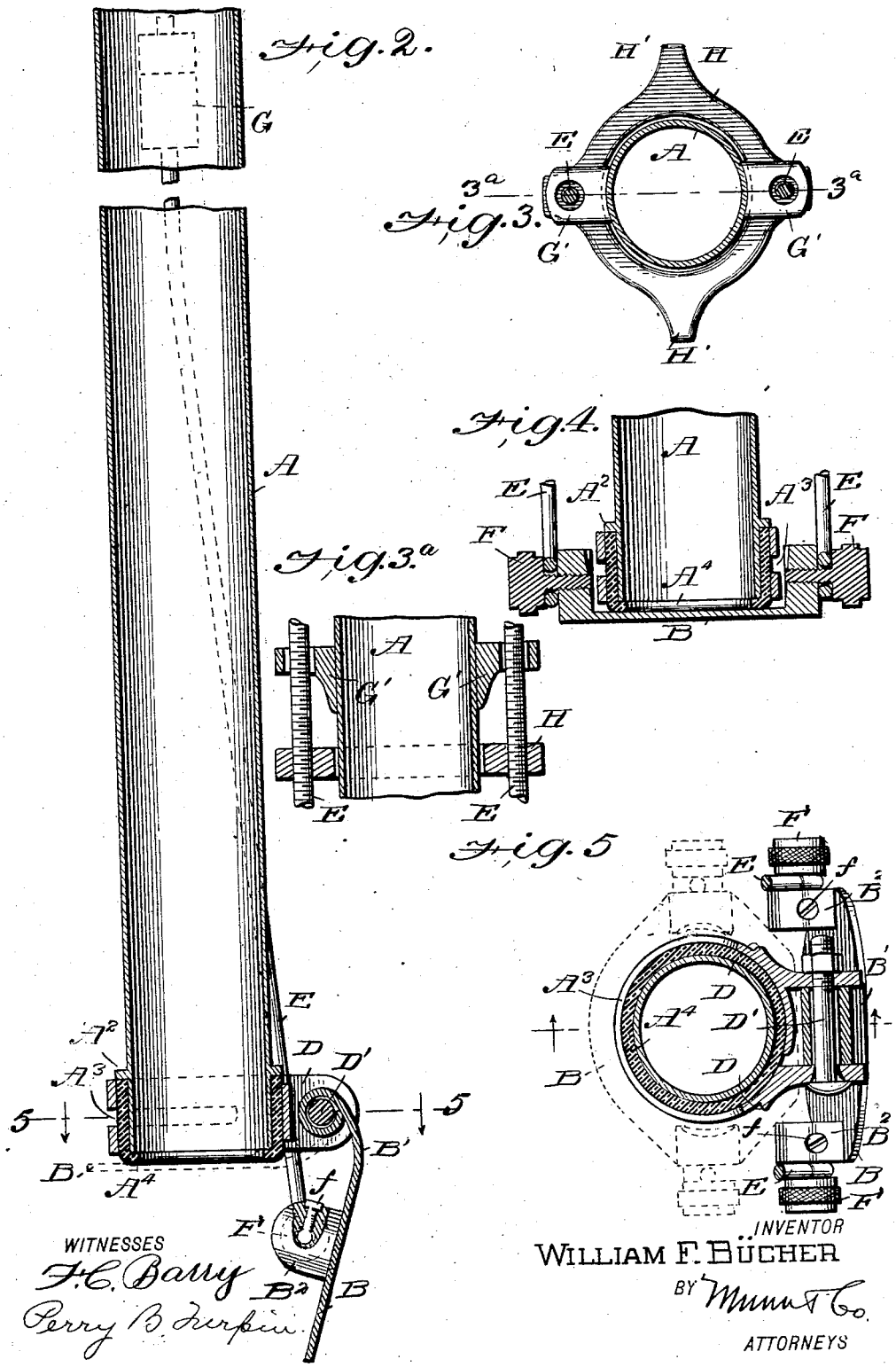
WITNESSES
INVENTOR
WILLIAM F. BÜCHER
BY
ATTORNEYS

UNITED STATES PATENT OFFICE.

WILLIAM F. BÜCHER, OF WASHINGTON, DISTRICT OF COLUMBIA.

MILK-SAMPLER.

No. 854,563.

Specification of Letters Patent.

Patented May 21, 1907.

Application filed September 15, 1906. Serial No. 334,774.

*To all whom it may concern:*

Be it known that I, WILLIAM FREDERICK BÜCHER, a citizen of the United States, and a resident of Washington, in the District of Columbia, have made an Improvement in Milk-Samplers, of which the following is a specification.

My invention is an improvement in sampling devices for use in removing from cans portions of the contents for the purpose of examination; and the invention consists in certain novel constructions and combinations of parts as will be hereinafter described and claimed.

In the drawings, Figure 1 is a vertical longitudinal section of the can with my invention applied. Fig. 2 is a vertical longitudinal section of the sampler. Fig. 3 is a cross section of the sampler. Fig. 3$^a$ is a detail section on about line 3$^a$—3$^a$ of Fig. 3. Fig. 4 is a detail longitudinal section of the lower portion of the sampler showing the gate closed; and Fig. 5 is a detail cross section on about line 5—5 of Fig. 2, the gate being shown open in full lines and closed in dotted.

In sampling milk from a can, it is important to secure equal portions throughout the vertical area of the milk being sampled, and it is also important to secure the sample without disturbing the cream or agitating the same so as to secure more than the proper proportion, and in doing this, I find it important to arrange the tube so that it will cut down through the cream and thence down through the milk to the bottom thereof, and leave the lower end of the tube practically unobstructed until the bottom of the can is reached. In securing this result, I employ a tube A open at both ends, having at its upper end a lip A' against which the hand may bear in closing the gate at the lower end of the tube, and such gate at the lower end of the tube is arranged to open entirely clear of the line of the tube, and the means for operating said gate extend upwardly along the outer side of the tube so the said gate B and its operating devices will not interfere in any way with the passage of the tube down through the milk in the can C, so the tube will receive as it is forced down through the milk, the proper proportion of cream, milk, etc., to secure a true sample of the contents of the can.

The gate B is suitably pivoted, and the rods for operating the same are suitably guided, and the whole is arranged for operation in the manner more fully described hereinafter.

The gate B is in the form of a flat plate having at one edge the projecting portion or lug B', which pivots on the bolt D' of the clamp D, the latter encircling the lower end of the tube A below an annular flange A$^2$ thereon, and operating to secure a tubular gasket A$^3$ whose lower end A$^4$ underlies the lower edge of the tube A and forms packing whereby the gate B will make a water tight joint with the tube A when closed, as shown in Fig. 4.

At its opposite sides, the gate B has the ears B$^2$ to which are connected the rods E, which by means of the screws F are locked from turning by the intersecting screws $f$ turning through the lugs B$^2$ as shown in Figs. 2 and 5. These rods E extend up along the outer sides of the tube A, through guides G arranged as shown in Figs. 1 and 2, and operating to prevent the movement of the rods beyond the point shown in Fig. 2, in opening the gate, so the gate cannot move past the center and prevent its closing by an upward pull on the rods E in closing the said gate. These guides G are in the form of lugs projecting from the opposite sides of the tube A, and the rods E project upwardly above the guides G and are connected with a hand hold H, preferably by threading the said rods in the hand hold, as shown in Fig. 3$^a$, and the rods extend upwardly above the hand hold H through guide lugs G' on the opposite sides of the tube A, and are provided above said guide lugs G' with stop projections E' preferably in the form of hand nuts screwed on the upper ends of the rods E, as will be understood from Fig. 1 of the drawings.

The hand hold H is preferably in the form of a ring encircling the tube A, and having at its opposite sides the projecting lugs H' which may be engaged by the fingers as indicated in dotted lines Fig. 1, when the palm of the hand is pressed against the upper end of the tube A, in the operation of closing the gate B and when holding the same closed in withdrawing the sample of milk from the can.

Manifestly, in the use of my invention, the several parts may be made of any suitable material, and it may be finished by nickeling or otherwise, in such manner as to avoid any objection to its use in connection with the milk.

As before suggested, an important feature of my invention is the construction whereby the gate forms no obstruction whatever at the lower end of the tube when said gate is open, and the devices for operating the gate are so arranged as not to interfere in any way with the passage into the tube of a portion of the milk commensurate with the cross sectional area of the tube.

In the drawings in Fig. 2, the gate is shown in the position it occupies before the sampler is inserted through the milk in the can, and in Fig. 1, I show the gate closed. It will be understood that the gate will retain the position shown in Fig. 2 as the tube is forced down through the milk until the bottom of the case is reached, when the engagement of the free edge of the gate with the bottom of the can will gradually close the gate to the position shown in Fig. 1, when the operator bearing with his palm upon the upper end of the tube and pulling up on the hand hold H, as will be understood from said Fig. 1, will hold the gate closed and the tube with the quantity of milk therein may be withdrawn as desired.

I claim:

1. A sampling device substantially as herein described, comprising a tube open at both ends and having at its lower end a gasket and a clamping ring securing the same and a bolt operating in connection with said ring, a gate pivoted on said bolt at the outer side of the tube and arranged to open to a position out of line with the said tube, rods secured to said gate at the opposite sides thereof, and extending thence upwardly along the outer side of the tube, guides for the said rods arranged on the tube and adapted to limit the movements of said rods whereby to prevent the opening of the gate beyond the center, a hand hold encircling the tube and connected with said rods above the said guides, and guides for the rods above the said hand holds, such rods having above the latter guides stop projections for engagement with such guides, substantially as and for the purposes set forth.

2. The combination of a tube, a pivoted gate for closing the lower end of the tube, rods connected with the gate and extending upwardly along the outer side of the tube, and a hand hold sliding along the tube and connected with the rods, substantially as set forth.

3. A sampler comprising a tube, a gate for closing the lower end of the tube, rods connected with the gate and extending up along the outer side of the tube, devices connected with the tube for guiding the said rods, and a hand hold connected with the rods and sliding along the tube, substantially as set forth.

4. The combination in a sampler, with a tube, and a gate for closing the lower end thereof, of rods for operating the gate and extending up along the outer side of the tube, guide devices for said rods for limiting the lateral movement thereof, and stop devices for limiting the longitudinal movement of the rods, substantially as set forth.

5. The combination in a sampling device, of a tube, a pivoted gate for closing the lower end of the tube, rods connected with the gate and extending up along the outer side of the tube, a hand hold connected with the rods and sliding along the tube, guide lugs for the said rods arranged above and below the hand hold, and stop devices on the rods above the upper guides for limiting the longitudinal movement of the rods, substantially as set forth.

6. The combination in a sampling device, of a tube, a gate for closing the lower end of the tube, said gate being pivoted at one side at a point outside of the tube, rods connected with the opposite sides of the gate and extending thence along the outer side of the tube, guides on the tube for said rods, and a hand hold encircling the tube adjacent to the upper end thereof and connected with the rods and arranged in position to be operated by the fingers of a hand, the palm of which is pressed against the upper end of the tube, substantially as set forth.

7. A sampler comprising a tube, a gate, for closing the lower end of the tube, a hand hold sliding along the upper end of the tube, and means extending upwardly along the outer side of the tube and connecting the gate with the hand hold whereby the latter may operate the gate relatively to the tube.

WILLIAM F. BÜCHER.

Witnesses:
SOLON C. KEMON,
PERRY B. TURPIN.